(12) United States Patent
Kim et al.

(10) Patent No.: US 9,587,147 B2
(45) Date of Patent: Mar. 7, 2017

(54) PRESSURE-SENSITIVE ADHESIVE COMPOSITIONS, POLARIZERS AND LIQUID CRYSTAL DISPLAYS COMPRISING THE SAME

(75) Inventors: No Ma Kim, Daejeon (KR); In Ho Hwang, Daejeon (KR); Jeong Min Ha, Daejeon (KR)

(73) Assignee: LG Chem, Ltd., Seoul (KR)

( * ) Notice: Subject to any disclaimer, the term of this patent is extended or adjusted under 35 U.S.C. 154(b) by 262 days.

(21) Appl. No.: 12/812,415

(22) PCT Filed: Jan. 7, 2009

(86) PCT No.: PCT/KR2009/000061
§ 371 (c)(1),
(2), (4) Date: Oct. 1, 2010

(87) PCT Pub. No.: WO2009/088213
PCT Pub. Date: Jul. 16, 2009

(65) Prior Publication Data
US 2011/0032455 A1 Feb. 10, 2011

(30) Foreign Application Priority Data

Jan. 11, 2008 (KR) .................. 10-2008-0003602
Dec. 1, 2008 (KR) .................. 10-2008-0120575

(51) Int. Cl.
*G02F 1/1335* (2006.01)
*C09J 133/06* (2006.01)
*G02B 5/30* (2006.01)

(52) U.S. Cl.
CPC ....... *C09J 133/06* (2013.01); *B32B 2457/202* (2013.01); *C09J 2201/606* (2013.01); *G02B 5/30* (2013.01); *G02F 2202/28* (2013.01); *Y10T 428/1059* (2015.01); *Y10T 428/1082* (2015.01)

(58) Field of Classification Search
CPC ............. C08G 2170/40; C08G 2270/00; C09J 7/0217; C09J 7/0246; C09J 133/08; C09J 133/10; C09J 133/12; C09J 133/06; C09J 2201/606; C08L 2205/04; G02B 5/30; G02F 2202/28; B32B 2457/202; Y10T 428/1059; Y10T 428/1082
USPC ..... 349/96–103; 428/1.1, 413, 523; 522/114
See application file for complete search history.

(56) References Cited

U.S. PATENT DOCUMENTS

| | | | | | |
|---|---|---|---|---|---|
| 4,302,553 | A | * | 11/1981 | Frisch et al. | .................... 525/28 |
| 4,616,057 | A | * | 10/1986 | Lindemann et al. | ......... 524/458 |
| 5,462,797 | A | * | 10/1995 | Williams et al. | ............. 428/345 |
| 6,054,007 | A | * | 4/2000 | Boyd et al. | .................... 156/245 |
| 2002/0020832 | A1 | | 2/2002 | Oka et al. | |
| 2003/0054166 | A1 | | 3/2003 | Chang et al. | |
| 2003/0192638 | A1 | * | 10/2003 | Yang et al. | .................... 156/230 |
| 2004/0127594 | A1 | * | 7/2004 | Yang et al. | .................... 522/114 |
| 2005/0191507 | A1 | | 9/2005 | Yang et al. | |
| 2005/0244633 | A1 | * | 11/2005 | Kobayashi et al. | ...... 428/355 R |
| 2006/0154078 | A1 | * | 7/2006 | Watanabe et al. | ............ 428/413 |
| 2006/0162857 | A1 | * | 7/2006 | Nagamoto et al. | ......... 156/272.8 |
| 2006/0182956 | A1 | * | 8/2006 | Kamiya et al. | ........... 428/355 R |
| 2006/0204749 | A1 | | 9/2006 | Kita et al. | |
| 2007/0055006 | A1 | * | 3/2007 | Kim et al. | ..................... 524/556 |
| 2007/0092733 | A1 | * | 4/2007 | Yang et al. | .................... 428/413 |
| 2011/0032455 | A1 | | 2/2011 | Kim et al. | |
| 2011/0109848 | A1 | * | 5/2011 | Yoon et al. | ..................... 349/96 |

FOREIGN PATENT DOCUMENTS

| | | | | |
|---|---|---|---|---|
| CN | 1212007 | A | 3/1999 | |
| CN | 1732193 | A | 2/2006 | |
| EP | 1 892 276 | A1 | 2/2008 | |
| JP | 10-046125 | A | 2/1998 | |
| JP | 10-46125 | A | 2/1998 | |
| JP | 2002047468 | A | * 2/2002 | ............ C09J 133/06 |
| JP | 2003049141 | A | * 2/2003 | ............ C09J 133/06 |
| JP | 2003-183596 | A | 7/2003 | |
| JP | 2005-281536 | A | 10/2005 | |
| JP | 2006-512442 | A | 4/2006 | |
| JP | 2007197659 | A | * 8/2007 | ............... C09J 4/02 |
| JP | 2007212995 | A | * 8/2007 | ........... G02F 1/1335 |
| JP | 2011-511852 | A | 4/2011 | |
| KR | 10-1998-079266 | A | 11/1998 | |
| KR | 10-2002-0060272 | A | 7/2002 | |
| KR | 10-2007-0094066 | | 9/2007 | |
| WO | WO 97/31076 | A1 | 8/1997 | |
| WO | WO 2007/068625 | A1 | 6/2007 | |
| WO | WO 2007068625 | A1 | * 6/2007 | ............ C09J 133/04 |

OTHER PUBLICATIONS

Sperling L. H., Interpenetrating Polymer Networks: An Overview, 1994, American Chemical Society, pp. 3-38.*
Definition of "ambient temperature," Dictionary.com.*
Benedek, Istvan, Pressure-Sensitive Formulation, Sep. 28, 2000, VSP, p. 77.*

* cited by examiner

*Primary Examiner* — Ellen S Wood
*Assistant Examiner* — Eli D Strah
(74) *Attorney, Agent, or Firm* — Dentons US LLP

(57) ABSTRACT

The invention relates to pressure-sensitive adhesive compositions which comprise (A) base resin, (B) the first multifunctional compound and (C) the second multifunctional compound that can react with the first multifunctional compound and realizes an interpenetrating network structure in the cured state, and relates to polarizers and liquid crystal displays comprising the same. The invention shows excellent durability under high temperature and/or high humidity condition and good properties such as machinability, removability and workability. The invention can provide the adhesive compositions efficiently suppressing light leakage generated in the liquid crystal displays. In particular, the adhesive compositions of the invention prevent light leakage even when being used in large display devices of 20 inches or more.

15 Claims, No Drawings

PRESSURE-SENSITIVE ADHESIVE COMPOSITIONS, POLARIZERS AND LIQUID CRYSTAL DISPLAYS COMPRISING THE SAME

This application is a 35 U.S.C. §371 National Stage entry of International Application No. PCT/KR2009/000061 filed Jan. 7, 2009, which claims priority to Korean Application No. 10-2008-0003602 filed Jan. 11, 2008 and Korean Application No. 10-2008-0120575 filed Dec. 1, 2008 all of which are hereby incorporated by reference for all purposes as if fully set forth herein in their entireties.

TECHNICAL FIELD

The present invention relates to a pressure-sensitive adhesive composition that is capable of suppressing light leakage phenomenon with having superior endurance reliability under high temperature and/or high humidity conditions and maintaining excellent physical properties; a polarizer; and a liquid crystal display comprising the same.

BACKGROUND ART

The liquid crystal display is a device representing images by liquid crystals inserted between two sheets of thin glass substrates. In said device, when voltages are applied through electrodes connected to liquid crystals, the molecular alignment manner of liquid crystals changes, whereby transmission ratio of lights passing through the liquid crystals is changed, so that pictures or colors may be represented. Such a liquid crystal display has advantages that it uses very little power and can be flatly and thinly made. Therefore, it is a display device being in the limelight of various fields at present.

For preparing the liquid crystal display, liquid crystal cells comprising liquid crystals and glass substrates having transparent electrode therein, and polarizers are basically required and suitable adhesives or pressure-sensitive adhesives are also required for binding them.

The polarizer comprises an iodine compound or a dichroic polarizing material aligned in a certain direction, and has multi-layer structure comprising TAC (triacetyl cellulose) protective films for protecting polarizing elements, and the like. In addition, the polarizer may additionally comprise a phase difference film, or a compensation film for wide view angle such as a liquid crystal type film. Each film constituting these multi-layer polarizers is made of materials having different molecular structures and compositions, and so has different physical properties. Thus, under high temperature and/or high humidity conditions, it has inferior dimensional stability, since shrinkage or expansion behavior of the materials having a unidirectional molecular alignment is different. Therefore, if the polarizer is fixed by a pressure-sensitive adhesive, then stress is concentrated on the TAC layer by shrinkage or expansion under high temperature and/or high humidity conditions, thereby birefringence and light leakage phenomenon occur.

As a representative method for solving said problems, there is a method for giving stress relief property thereto by designing the pressure-sensitive adhesive to have high creep against external stress and to be easily modified. Specifically, it is a method for mixing high molecular weight polymer containing a functional group which may react with a cross-linking agent, with low molecular weight material including less or no cross-linkable functional group (KR Laid-open Patent Publication No. 1998-79266, and JP Laid-open Patent Publication Nos. 2002-47468 and 2003-49141).

However, the pressure-sensitive adhesive composition disclosed in said techniques has very poor tailoring property. Thus, on preparing polarizers, crooking or pressing phenomenon is arisen in the pressure-sensitive adhesive. So, there is a problem that yield is highly lowered.

As other technique for preventing light leakage phenomenon, there is a method for designing the pressure-sensitive adhesive to be very hard. When the pressure-sensitive adhesive has hard property, shrinking or expansion of the polarizer under high temperature and/or high humidity conditions is suppressed, whereby the resulting stress is minimized and focused on the outermost, so that relatively good optical properties may be realized (JP Laid-open Patent Publication Nos. 2007-197659 and 2007-212995).

However, in case of the pressure-sensitive adhesive compositions disclosed in said publications, when a display device such as a monitor has small size, it exhibits performance to a certain extent. But, in large monitors with a size of 20 inches or more, there is a problem that performance of controlling light leakage is lowered.

DISCLOSURE

Technical Problem

The present invention is accomplished considering the problems of the prior arts as described above, and is intended to provide a pressure-sensitive adhesive composition having excellent endurance reliability under high temperature and/or high humidity conditions and physical properties such as cuttability, re-movability and workability, and especially representing superior light leakage-preventing property, a polarizer and a liquid crystal display using the same.

Technical Solution

As means to solve said object, the present invention provides a pressure-sensitive adhesive composition, including interpenetrating polymer networks in a cured state, wherein the composition comprises (A) an base resin, (B) a primary multi-functional compound, and (C) a secondary multi-functional compound capable of reacting with (B) the primary multi functional compound.

As another means to solve said object, the present invention provides a polarizer comprising a polarizing film, and a pressure-sensitive adhesive layer which is formed on one or both sides of said polarizing film and comprises a cured product of the pressure-sensitive adhesive composition according to the present invention.

As another means to solve said object, the present invention provides a liquid crystal display comprising a liquid crystal panel in which the polarizer according to the present invention is bonded to one or both sides of a liquid crystal cell.

Advantageous Effects

According to the present invention, the pressure-sensitive adhesive composition is provided, which can outstandingly suppress light leakage phenomenon, with having excellent endurance reliability under high temperature and/or high humidity conditions and physical properties such as cuttability, re-movability and workability. Especially, there is an advantage that the present pressure-sensitive adhesive composition represents superior light leakage-preventing property even in large sized display devices such as monitors having a size of 20 inches or more.

BEST MODE

The present invention relates to a pressure-sensitive adhesive composition, including interpenetrating polymer networks (hereinafter, it can be referred to as "IPN") in a cured state, wherein the composition comprises (A) a base resin; (B) a primary multi-functional compound; and (C) a secondary multi-functional compound capable of reacting with the (B) primary multi functional compound.

The present invention also relates to a polarizer comprising: a polarizing film, and a pressure-sensitive adhesive layer which is formed on one or both sides of said polarizing film and comprises a cured product of the pressure-sensitive adhesive composition according to the present invention.

The present invention also relates to a liquid crystal display comprising a liquid crystal panel in which the polarizer according to the present invention is bonded to one or both sides of a liquid crystal cell.

The present pressure-sensitive adhesive composition is described in more detail below.

The pressure-sensitive adhesive composition of the present invention includes IPN in a cured state, and the term "cured state" used herein refers to a state in which the pressure-sensitive adhesive composition turns into a pressure-sensitive adhesive through a UV irradiation process or a heating process, and the like. Also, the term "interpenetrating polymer networks" used herein refers to a state in which the pressure-sensitive adhesive comprises a crosslinking structure (hereinafter, it can be referred to as a "secondary crosslinking structure") formed form reactions of the primary and secondary multi-functional compound, together with a crosslinking structure (hereinafter, it can be referred to as a "primary crosslinking structure") formed from the base resin.

In the present invention, the kinds of the (A) base resin are not specially limited, and any conventional base resin used in a pressure-sensitive adhesive may be freely used.

For example, the composition of the present invention may comprise an acrylic copolymer as the base resin forming the primary crosslinking structure.

In the present invention, it is preferred that the acrylic copolymer has a weight average molecular weight ($M_w$) of 1,000,000 or more. If the weight average molecular weight of said copolymer is less than 1,000,000, it is apprehended that the endurance reliability of the composition is lowered, so that bubbles or peeling phenomenon may be occurred due to lowered cohesion under high temperature and/or high humidity conditions.

As long as the weight average molecular weight of the copolymer usable in the present invention is 1,000,000 or more, the upper limit is not particularly restricted. However, when said weight average molecular weight is excessively increased, it is apprehended that the coating property is lowered due to increasing of viscosity. Therefore, the weight average molecular weight may be appropriately controlled within a range of no more than 2,500,000.

The specific composition of the copolymer in the present invention is not particularly restricted, for instance, the copolymer may comprise 80 to 99.8 parts by weight of (meth)acrylic acid ester monomer, and 0.01 to 10 parts by weight of a monomer containing a crosslinkable functional group.

In the above, the kind of (meth)acrylic acid ester monomer is not specially limited, and for example alkyl(meth)acrylate may be used. In that case, when the alkyl group included in the (meth)acylate is excessively long chain, it is apprehended that cohesion of the pressure-sensitive adhesive is lowered and glass transition temperature ($T_g$) and adhesiveness are not easily controlled. Therefore, it is preferred to use alkyl(meth)acrylate having an alkyl group with 2 to 14 carbon atoms. An example of such a monomer may include one or more selected from the group consisting of ethyl(meth)acrylate, n-propyl(meth)acrylate, isopropyl (meth)acrylate, n-butyl (meth)acrylate, t-butyl(meth)acrylate, sec-butyl(meth)acrylate, pentyl (meth)acrylate, 2-ethylhexyl(meth)acrylate, 2-ethylbutyl(meth)acrylate, n-octyl (meth)acrylate, isooctyl(meth)acrylate, isononyl(meth)acrylate, lauryl(meth)acrylate and tetradecyl(meth)acrylate. It is preferred that the (meth)acrylic acid ester monomer is comprised in an amount of 80 to 99.8 parts by weight, based on 100 parts by weight of the copolymer. If said content is less than 80 parts by weight, it is apprehended that the initial adhesion strength of pressure-sensitive adhesive is lowered. If it is in excess of 99.8 parts by weight, it is apprehended that a problem is caused in durability due to lowered cohesion.

The monomer containing a cross-linkable functional group gives a cross-linkable functional group to the acrylic copolymer, and serves to control endurance reliability under high temperature and/or high humidity conditions, adhesion strength and cohesion by reacting with a multi-functional cross-linking agent and/or a silane coupling agent as described below.

An example of usable monomers containing a cross-linkable functional group herein may include, but is not limited to, monomers containing a hydroxyl group, monomers containing carboxyl group, monomers containing nitrogen or monomers containing glycidyl group. In the present invention, one or two or more of the foregoing monomers may be used. An example of usable monomers containing a hydroxyl group herein may include, but is not limited to, one or two or more species of 2-hydroxyethyl (meth)acrylate, 2-hydroxypropyl(meth)acrylate, 4-hydroxybutyl (meth)acrylate, 6-hydroxyhexyl(meth)acrylate, 8-hydroxyoctyl(meth)acrylate, 2-hydroxyethyleneglycol(meth) acrylate or 2-hydroxypropyleneglycol (meth)acrylate. An example of usable monomers containing a carboxyl group herein may include, but is not limited to, one or two or more species of (meth)acrylic acid, 2-(meth)acryloyloxy acetic acid, 3-(meth)acryloyloxy propylic acid, 4-(meth)acryloyloxy butylic acid, acrylic acid dimer, itaconic acid, maleic acid and maleic anhydride. An example of usable monomers containing nitrogen herein may include, but is not limited to, one or two or more species of 2-isocyanatoethyl(meth) acrylate, 3-isocyanatopropyl (meth)acrylate, 4-isocyanatobutyl(meth)acrylate, (meth)acrylamide, N-vinyl pyrolidone and N-vinyl caprolactam. An example of usable monomers containing glycidyl group herein may include, but is not limited to, glycidyl(meth)acrylate.

In the present invention, it is preferable that the monomer containing a crosslinkable functional group is selected considering the kind of the primary and secondary multi-functional compounds (B) and (C). Specifically, it is preferable that one species among the foregoing monomers containing a crosslinkable functional group is used from the viewpoint of excluding double reaction with the multi-functional compounds, however, as long as the double reaction with the multi-functional compounds can be excluded, two or more species among the foregoing monomer containing a crosslinkable functional group may be used.

It is preferred that the monomer containing a crosslinkable functional group as above is contained in an amount of 0.01 to 10 parts by weight, based on 100 parts by weight of the copolymer. If said content is less than 0.01 parts by weight, it is apprehended the endurance reliability under high temperature and/or high humidity conditions is lowered. If it is in excess of 10 parts by weight, it is apprehended that adhesiveness and/or peel force is lowered.

Also, in the copolymer of the present invention, a functional monomer represented in Formula 1 below may be further copolymerized. Such a functional monomer may be added for controlling glass transition temperature of pressure-sensitive adhesive and giving other functions thereto.

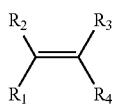

[Formula 1]

wherein, $R_1$, $R_2$ and $R_3$ represents independently hydrogen or alkyl, $R_4$ represents cyano; phenyl unsubstituted or substituted with alkyl; acetyloxy; or $COR_5$, where $R_5$ represents amino unsubstituted or substituted with alkyl or alkoxyalkyl.

In the definitions of $R_1$ to $R_5$ of the above formula, alkyl or alkoxy means alkyl or alkoxy having 1 to 8 carbon atom(s), and is, preferably, methyl, ethyl, methoxy, ethoxy, propoxy or butoxy.

The specific kind of monomer represented by the above Formula 1 may include, but is not limited to, one or two or more of nitrogen-containing monomers such as (meth)acrylonitrile, (meth)acrylamide, N-methyl(meth)acrylamide or N-butoxy methyl (meth)acrylamide; styrene monomer such as styrene or methyl styrene; or carbonic acid vinyl ester such as vinyl acetate, and the like. When the functional monomer as above is contained in the acrylic copolymer, the content is, preferably, 20 parts by weight or less, based on 100 parts by weight of the copolymer. If said content is in excess of 20 parts by weight, it is apprehended that flexibility and/or peel force of the pressure-sensitive adhesive is lowered.

The method for preparing the copolymer is not particularly restricted. For example, it can be prepared through general methods such as solution polymerization, photopolymerization, bulk polymerization, suspension polymerization or emulsion polymerization. Especially, it is preferred to use solution polymerization. Preferably, such solution polymerization is carried out at a polymerization temperature of 50° C. to 140° C. by mixing an initiator in a state that each monomer is homogeneously mixed. At this time, as a usable initiator, a usual initiator, for example, an azo-based polymerization initiator such as azo-bisisobutyronitrile or azobiscyclohexanecarbonitrile; and/or a peroxide such as benzoyl peroxide or acetyl peroxide may be included.

The present pressure-sensitive adhesive composition comprises (B) a primary multi-functional compound and (C) a secondary multi-functional compound capable of reacting with said component (B), together with the (A) base resin as previously described. It is preferable that the (B) and (C) compounds show specific reactivity to each other, and do not participate in cross-linking reaction between the (A) base resin and a multi-functional cross-linking agent. Therefore, reaction products of the (B) and (C) compounds may impart IPN structure in the present composition with a cross-linking network formed by the (A) base resin. An example of usable (B) and (C) multi-functional compounds herein is not specially limited, as long as it has property as described above.

An example of usable (B) and (C) compounds herein may include, but is not limited to, multi-functional alcohol compounds, multi-functional carboxylic acid compound, multi-functional anhydride compound, multi-functional amine compound, multi-functional glycidyl compound, multi-functional isocyanate compound or multi-functional silicon compound. At this time, the multi functional compounds may be compounds having 2 to 6 functionalities, but is not limited thereto.

An example of usable multi-functional alcohol compounds herein may include, but is not limited to, one or two or more species of 4-amino-4-(3-hydroxypropyl)-1,7-heptanediol, 1,5-dihydroxy anthraquinone, 1,2-benzene dimethanol, 1,2,4-benzenetriol, 2-benzyloxy-1,3-propanediol, 2,2'-biphenyldimethanol, 2,2'-bipyridine-3,3'-diol, 2,2-bis(bromomethyl)-1,3-propanediol, 1-[N,N-bis(2-hydroxyethyl)amino]-2-propanol, N,N-bis(2-hydroxyethyl)isonicotinamide, bis(2-hydroxyethyl)terephthalate, 2,2-bis(hydroxymethyl)butyric acid, 4-bromo-3,5-dihydroxybenzoic acid, 2-(bromomethyl)-2-(hydroxymethyl)-1,3-propanediol, 3-bromo-1,2-propanediol, tert-Butylhydroquinone, chlorohydroquinone, 5-chloro-2,3-pyridinediol, 1,2-cyclohexanediol, cis,cis-1,3,5-cyclohexanetriol dihydrate, 3-cyclohexene-1,1-dimethanol, cis-1,2-cyclopentanediol, 1,2-decanediol, 2,3-dibromo-1,4-butanediol, trans-2,3-dibromo-2-butene-1,4-diol, 2,5-dibromohydroquinone, 2,3-dichloro-5,8-dihydroxy-1,4-naphthoquinone, diethyl bis(hydroxymethyl)malonate, diethyl 2,5-dihydroxyterephthalate, 3,5-dihydroxyacetophenone, 4,4'-dihydroxybenzophenone, 2,5-dihydroxy-1,4-benzoquinone, 2,2-dihydroxy-5-methoxy-1,3-indandione hydrate, 2,6-Dihydroxy-4-methyl-3-pyridinecarbonitrile, tris(2-hydroxyethyl)isocyanurate, 1,1,1-tris(4-hydroxyphenyl)ethane, 2,4,6-trihydroxybenzoic acid, 3,3,3',3'-tetramethyl-1,1'-spirobiindane-5,5',6,6'-tetraol and N,N,N',N'-tetrakis(2-Hydroxypropyl)ethylenediamine. An example of usable multi-functional carboxylic acid compounds herein may include, but is not limited to, one or two or more species of 1,3-acetonedicarboxylic acid, 1,3-adamantanediacetic acid, 1,3-adamantanedicarboxylic acid, azelaic acid, benzylmalonic acid, biphenyl-4,4'-dicarboxylic acid, 2,2'-bipyridine-4,4'-dicarboxylic acid, bis(carboxymethyl)trithiocarbonate, 2-bromoterephthalic acid, 5-tert-butylisophthalic acid, butylmalonic acid, 1,2,3,4-butanetetracarboxylic acid and diethylenetriaminepentaacetic acid. An example of usable multi-functional anhydride compounds herein may include, but is not limited to, one or two or more species of 4-amino-1,8-naphthalic anhydride, benzophenone-3,3',4,4'-tetracarboxylic dianhydride, 3,3',4,4'-biphenyltetracarboxylic dianhydride, diethylenetriaminepentaacetic dianhydride, ethylenediaminetetraacetic dianhydride, 4,4'-(4,4'-isopropylidenediphenoxy)bis(phthalic anhydride), 4,4'-oxydiphthalic anhydride and pyromellitic dianhydride. An example of usable multi-functional amine compounds herein may include, but is not limited to, one or two or more species of 2-aminophenyl disulfide, 1,2,4,5-benzenetetracarboxamide), 4,4'-(1,1'-biphenyl-4,4'-diyldioxy)dianiline, 6-chloro-3,5-diamino-2-pyrazinecarboxamide, 1,3-cyclohexanebis(methylamine), 4,4'-diaminobenzanilide, diaminobenzophenone, 2,6-diaminopurine, 2,5-dimethyl-1,4-phenylenediamine, 4,4'-(Hexafluoroisopropylidene)dianiline, 3,3'-methylenedianiline, 3,4'-oxydianiline, 4,4'-(1,3-phenylenedioxy)dianiline, poly(1,4-butanediol)bis(4-aminobenzoate) (average $M_n$=400~1,300), tris(2-aminoethyl) amine and p-xylylenediamine. An example of usable multi-functional glycidyl compounds herein may include, but is not limited to, one or two or more species of 1,3-bis(N,N-diglycidylaminomethyl)cyclohexane, N,N,N'N'-tetraglycidyl-m-xylenediamine, triglydicyl isocyanurate, tris(2-carboxyethyl)isocyanurate, bis[4-(glycidyloxy)phenyl] methane, 1,3-butadiene diepoxide, 1,4-butanediol diglycidyl ether, 1,4-cyclohexanedimethanol diglycidyl ether, dicyclopentadiene dioxide, diglycidyl 1,2-cyclohexanedicarboxylate, N,N-diglycidyl-4-glycidyloxyaniline, glycerol diglycidyl ether, 4,4'-methylenebis(N,N-diglycidylaniline), resorcinol diglycidyl ether and tris(4-hydroxyphenyl)methane triglycidyl ether. An example of usable multi-functional isocyanate compounds herein may include, but is not limited to, one or two or more species of tolylene diisocyanate, xylene diisocyanate, diphenylmethane diisocyanate, hexamethylene diisocyanate, isophorone diisocyanate, tetramethylxylene diisocyanate, naphthalene diisocyanate and reaction product of diisocyanate and polyol (ex. trimethylol propane). An example of usable multi-functional silicon compounds herein may include, but is not limited to, one or two or more species of 1,4-bis[dimethyl[2-(5-norbornen-2-yl)ethyl]silyl]benzene, 1,3-dicyclohexyl-1,1,3,3-tetrakis(dimethylsilyloxy)disiloxane, 1,3-dicyclohexyl-1,1,3,3-tetrakis(dimethylvinylsilyloxy)disiloxane, 1,3-dicyclohexyl-1,1,3,3-tetrakis[(norbornen-2-yl)ethyldimethylsilyloxy]disiloxane, 1,3-divinyltetramethyldisiloxane, 1,1,3,3,5,5-hexamethyl-1,5-bis[2-(5-norbornen-2-yl)ethyl]trisiloxane, silatrane glycol, 1,1,3,3-tetramethyl-1,3-bis[2-(5-norbornen-2-yl)ethyl]disiloxane, 2,4,6,8-tetramethyl-2,4,6,8-tetravinylcyclotetrasiloxane, N-[3-(trimethoxysilyl)propyl]-N'-(4-vinylbenzyl)ethylenediamine, 6-bis(trichlorosilyl)hexane, 1,6-bis(trichlorosilyl)ethane, dimethyldiacetoxysilane, methyltriethoxysilane, vinylmethyldiacetoxysilane, methyltrimethoxysilane, ethyltriacetoxysilane, dimethyltetramethoxydisiloxane, methyltriacetoxysilane, tetraethoxysilane, vinyltriacetoxysilane, tetramethoxysilane, silicon tetraacetate, tetrapropoxysilane, dimethyldiethoxysilane, 1,1,3,3-tetramethyl-1,3-diethoxydisiloxane, (bis(N-methylbenzylamido)ethoxymethylsilane, bis(dimethylamino)dimethylsilane, bis(dimethylamino)methylvinylsilane, tris(dimethylamino)methylsilane, tris(cyclohexylamino)methylsilane, vinyltris(methylethylketoximine)silane, methyltris(methylethylketoxime)silane, vinyltris(isopropenoxy)silane, tetramethyldisiloxane, 1,3,5,7-tetramethylcyclotetrasiloxane, methylhydrocyclosiloxane, 1,3-divinyltetramethyldisiloxane, 1,3,5-trivinyl-1,1,3,5,5-pentamethyl trisiloxane and tetravinyltetramethylcyclotetrasiloxane.

In the present invention, as (B) and (C) multi-functional compounds, at least a pair of compounds among the foregoing compounds may be appropriately selected considering a crosslinkable functional group contained in the (A) base resin, a crosslinking agent, and specific reactivity to each other.

In the pressure-sensitive adhesive composition, the (B) and (C) multi-functional compounds as above may be, respectively, comprised in an amount of 1 to 40 parts by weight, relative to 100 parts by weight of the (A) base resin.

If said content is less than 1 parts by weight, it is apprehended that IPN structure is not effectively realized, and if said content is in excess of 40 parts by weight, it is apprehended that the pressure-sensitive adhesive property is lowered.

The present pressure-sensitive adhesive composition may further comprise a multi-functional cross-linking agent together with the components as described above. Said cross-linking agent is capable of controlling cohesion and adhesive property and serves to impart the primary cross-linking structure by reacting with the (A) base resin.

Specific kind of the cross-linking agent which may be used herein is not particularly restricted, and may include conventional ones such as an isocyanate compound, an epoxy compound, an aziridine compound and a metal chelate compound.

An example of the isocyanate compound includes tolylene diisocyanate, xylene diisocyanate, diphenylmethane diisocyanate, hexamethylene diisocyanate, isophorone diisocyanate, tetramethylxylene diisocyanate, naphthalene diisocyanate and a reaction product of any one of the foregoing with polyol (ex. trimethylol propane); an example of the epoxy compound includes ethyleneglycol diglycidylether, triglycidylether, trimethylolpropane triglycidylether, N,N,N',N'-tetraglycidyl ethylenediamine and glycerin diglycidylether; an example of the aziridine compound include N,N'-toluene-2,4-bis(1-aziridinecarboxamide), N,N'-diphenylmethane-4,4'-bis(1-aziridinecarboxamide), triethylene melamine, bisisophthaloyl-1-(2-methylaziridine) and tri-1-aziridinylphosphine oxide. Also, an example of the metal chelate compound includes compound in which multivalent metal such as aluminum, iron, zinc, tin, titan, antimony, magnesium and/or vanadium is being chelated to acetyl acetone or ethyl acetoacetate. In the present invention, one or two or more of the forgoing may be used alone or in a mixture thereof.

It is preferred from the viewpoint of carrying out homogeneous coating that the cross-linking agent is controlled for cross-linking reaction of functional groups to be not performed on forming pressure-sensitive adhesive layer. That is, said cross-linking agent forms a cross-linking structure in drying and aging steps after coating to improve cohesion, whereby it may improve physical properties of pressure-sensitive adhesive articles such as adhesive property and cuttability. Preferably, this cross-linking agent is contained in an amount of 0.1 to 5 parts by weight, relative to 100 parts by weight of the (A) base resin as previously described. If said content is less than 0.1 parts by weight, it is apprehended that the cohesion of the pressure-sensitive adhesive is lowered, since the cross-linking reaction is not well performed. If it is in excess of 5 parts by weight, it is apprehended that the endurance reliability is lowered by causing interlayer peeling or loosing phenomenon, since the cross-linking reaction is excessively proceeded.

The present pressure-sensitive adhesive composition may further comprise a silane coupling agent in addition to the components as described above. Such a coupling agent improves adhesion and bonding stability between the pressure-sensitive adhesive and a glass substrate, whereby heat resistance and humidity resistance can be improved. Also, when the pressure-sensitive adhesive is left under high temperature and/or high humidity for a long time, the coupling agent serves to improve attachment reliability. Especially, it is preferred herein to use a silane coupling agent having an acetoacetate group or a β-cyanoacetyl group, which may react with the cross-linkable functional group contained in the (A) base resin as described above. An example of such a coupling agent may include γ-acetoacetate propyl trimethoxy silane, γ-acetoacetate propyl triethoxy silane, β-cyanoacetyl trimethoxy silane, β-cyanoacetyl triethoxy silane, and the like. One or two or more of the forgoing may be used alone or in a mixture thereof. Preferably, such a silane coupling agent is contained in an amount of 0.01 to 5 parts by weight in the composition, relative to 100 parts by weight of the (A) base resin. More preferably, it is contained therein in an amount of 0.01 to 1 part by weight. If said content is less than 0.01 parts by weight, it is apprehended that the effect of increasing adhesion strength is slight. If it is in excess of 5 parts by weight, it is apprehended that the endurance reliability is lowered, so that bubbles or peeling phenomenon may be caused.

Also, from the viewpoint of controlling adhesion performance, the present pressure-sensitive adhesive composition may further comprise 1 to 100 parts by weight of a tackifier resin, relative to 100 parts by weight of the (A) base resin. Specific kind of such a tackifier resin is not particularly restricted, and may use one or two or more mixtures of a (hydrogenated) hydrocarbon resin, a (hydrogenated) rosin resin, a (hydrogenated) rosin ester resin, a (hydrogenated) terpene resin, a (hydrogenated) terpene phenol resin, a polymerized rosin resin, or a polymerized rosin ester resin and the like. If the content of said tackifier resin is less than 1 part by weight, it is apprehended that the effect caused by adding it is slight. If it is in excess of 100 parts by weight, it is apprehended that the effect of improving compatibility and/or cohesion is lowered.

Also, the present pressure-sensitive adhesive composition may further comprise one or more additives selected from the group consisting of an epoxy resin, a hardener, a UV stabilizer, an antioxidant, a colorant, a reinforcing agent, a filling agent, a defoaming agent, a surfactant and a plasticizer in a range of not affecting the effect of the present invention.

In addition, the present invention relates to a polarizer, comprising:

a polarizing film; and a pressure-sensitive adhesive layer which is formed on one or both sides of said polarizing film, and comprises a cured product of the pressure-sensitive adhesive composition according to the present invention as described above.

Specific kind of a polarizing film (or polarizing device) constituting said polarizer of the present invention is not particularly restricted. For example, a film obtained by containing a polarizing component such as iodine or dichroic dye into polyvinyl alcohol resin film, and elongating the resulting product may be used as said polarizing film. Said polyvinyl alcohol resin may comprise polyvinyl alcohol, polyvinyl formal, polyvinyl acetal and hydrolysate of ethylene-vinyl acetate copolymer, and the like. The thickness of said polarizing film is also not particularly restricted. It may be formed in a usual thickness.

The polarizer may be formed as a multilayer film, wherein protective films, such as a cellulose film, for example, triacetyl cellulose; a polyester film, for example a polycarbonate film or a polyethylene terephthalate; a polyether sulphone film; and/or a polyolefin film, for example, polyethylene film, polypropylene film, polyolefin film having cyclo or norbornene structure, or ethylene-propylene copolymer, are laminated on one or both sides of the polarizing film. At this time, the thickness of these protective films is also not particularly restricted. It may be formed in a usual thickness.

The method of forming the pressure-sensitive adhesive layer on the polarizing film as above is not particularly restricted, and may be used, for example, as a method of coating and curing the pressure-sensitive adhesive composition on said polarizing film with Bar Coater and the like, or a method of coating and drying the pressure-sensitive adhesive composition on the surface of releasable substrate and then, transferring the pressure-sensitive adhesive layer to the surface of polarizing film.

In addition, on forming said pressure-sensitive adhesive layer, it is preferred to use the composition after sufficiently removing components causing bubbles such as volatile ingredients or reaction residues within the composition. If the cross-linking density or molecular weight is excessively low and thus elasticity modulus is lowered, it is apprehended that scatterers are formed inside by magnifying small bubbles present between the glass plate and the pressure-sensitive adhesive layer at high temperature conditions.

In the pressure-sensitive adhesive layer, the gel content as represented in General Formula 1 below may be 80% to 99%, preferably 90% to 99%.

$$\text{gel content (\%)} = B/A \times 100 \qquad \text{[General Formula 1]}$$

wherein, A represents weight of the pressure-sensitive adhesive, and B represents dry weight of insoluble content after depositing the pressure-sensitive adhesive in ethyl acetate at ambient temperature for 48 hours.

If the gel content is less than 90%, it is apprehended that endurance reliability under high temperature and/or high humidity conditions is lowered. If the gel content is in excess of 99%, it is apprehended that stress-releasing-property is lowered.

In addition, the present polarizer may further comprise one or more functional layers selected from the group consisting of protective layer, reflecting layer, anti-glare layer, phase difference plate, compensation film for wide view angle, and brightness enhancing film, and the pressure-sensitive adhesive comprising the pressure-sensitive adhesive composition according to the present invention may be attached to each functional layer.

In addition, the present invention relates to a liquid crystal display comprising a liquid crystal panel, in which polarizer according to the present invention is bonded to one or both sides of a liquid crystal cell.

Specific kind of liquid crystal cell, constituting the liquid crystal display of the present invention as above, is not particularly restricted, and includes all general liquid crystal cells such as TN (Twisted Neumatic), STN (Super Twisted Neumatic), IPS (In Plane Switching) or VA (Vertical Alignment). Specific kind of other construction included in the liquid crystal display of the present invention and process for preparing the same is not particularly restricted, and general constructions in this field may be selected and used without limitation.

[Mode for Invention]

The present invention is explained in more detail through examples according to the present invention and comparative examples not according to the present invention below, but the scope of the present invention is not restricted to examples as described below.

EXAMPLE 1

Preparation of Acrylic Copolymer

To 1 L reactor, which nitrogen gas was refluxed in and equipped with a cooling system for easy temperature control, was added a mixture of monomers consisting of 99 parts by weight of n-butyl acrylate (n-BA) and 1.0 parts by weight of hydroxyethyl acrylate (HEA). Then, 120 parts by weight of ethyl acetate (EAc) was added thereto as a solvent.

To remove oxygen, nitrogen gas was purged for 60 minutes. Then, the temperature was kept at 60° C. and 0.03 parts by weight of azobisisobutyronitrile (AIBN) as a initiator was added thereto and reacted for 8 hours. After the reaction, the resulting product was diluted with ethyl acetate (EAc) to prepare an acrylic copolymer having a solid content of 15% by weight, a weight average molecular weight of 1,600,000, and a molecular weight distribution of 4.9.

Preparation of Pressure-Sensitive Adhesive Composition

Relative to 100 parts by weight of the acrylic copolymer as prepared above, 10 parts by weight of tris(2-carboxyethyl)isocyanurate, 10 parts by weight of triglycidyl isocyanurate, 10 parts by weight of TDI triisocyanate (Coronate L, manufactured by Nippon Polyurethane Co., Ltd. (JP)) and 0.1 parts by weight of silane coupling agent containing a β-cyanoacetyl group (manufactured by LG Chemical Ltd.) were mixed and a concentration of solid content in the resulting coating liquid was controlled to 15%, to prepare a pressure-sensitive adhesive composition.

TABLE 1

|  | Copolymer | | |
|---|---|---|---|
|  | A | B | C |
| n-BA | 99 | 99.5 | 100 |
| 2-HEA | 1 | — | — |
| AA | — | 1 | — |
| AIBN | 0.05 | 0.05 | 0.05 |
| EAc | 120 | 120 | 120 |
| Mw (10,000) | 190 | 180 | 190 |
| Molecular Weight Distribution | 4.9 | 5.4 | 4.3 | n-BA: n-butylacrylate
2-HEA: 2-hydroxyethyl acrylate
AA: acrylic acid
AIBN: azobisisobutyronitrile
EAc: ethyl acetate Preparation of Pressure-sensitive Adhesive Polarizer Using each coating liquids as represented in below Table 2, pressure-sensitive adhesive polarizer was prepared by the same method as Example 1.

TABLE 2

|  | Example | | | | | | Comparative Example | | |
|---|---|---|---|---|---|---|---|---|---|
|  | 1 | 2 | 3 | 4 | 5 | 6 | 1 | 2 | 3 |
| Copolymer A | 100 | 100 | 100 | — | — | — | 100 | — | — |
| Copolymer B | — | — | — | 100 | 100 | — | — | 100 | — |
| Copolymer C | — | — | — | — | — | 100 | — | — | 100 |
| TCI | 10 | 5 | 5 | — | — | — | — | — | — |
| TGI | 10 | 5 | — | — | 3 | — | — | — | — |
| THI | — | — | — | 5 | 5 | 5 | — | — | — |
| TGXDA | — | — | 5 | 3 | — | — | — | 3 | — |
| Coronate L | 3 | 3 | 3 | 5 | 5 | 5 | 3 | — | 5 |
| M812 | 0.1 | 0.1 | 0.1 | 0.1 | 0.1 | 0.1 | 0.1 | 0.1 | 0.1 |

TCI: tris(2-carboxyethyl)isocyanurate
TGI: triglycidyl isocyanurate
THI: tris(2-hydroxyethyl)isocyanurate
TGXDA: N,N,N',N'-tetraglycidyl-m-xylenediamine
Coronate L: TDI triisocyanate (manufactured by Nippon Polyurethane Co., Ltd. (JP))
M812: silane coupling agent containing β-cyanoacetyl group (LG Chemical Ltd.)

Preparation of Pressure-Sensitive Adhesive Polarizer

The pressure-sensitive adhesive composition as prepared above was coated on a polyethyleneterephthalate (PET) (MRF-38, manufactured by Mitsubishi Corporation) film that has been subjected to release treatment, and has a thickness of 38 μm to have a thickness of 25 μm an after dryness, and said film was dried in an oven at 110° C. for 3 minutes. Then, the dried pressure-sensitive adhesive layer was stored at Temperature and Humidity Room Chamber (23° C., 55% RH) for about one day, and laminated on the WV coating layer of the polarizer that a WV (Wide View) liquid crystal layer was coated on one side.

EXAMPLES 2 TO 6 AND COMPARATIVE EXAMPLES 1 TO 3

Preparation of Acrylic Copolymer

Acrylic copolymers were prepared by the same method as Example 1 above, except that on preparing the copolymers, raw materials as shown in Table 1 below were used (In Table 1, the acrylic copolymer A is the same as the copolymer prepared in Example 1).

Using the polarizers prepared in Examples and Comparative Examples, gel fraction, adhesion strength, re-movability, endurance reliability and uniformity of light transmission (light leakage) were measured by methods as shown below.

1. Measurement of Gel Fraction

The prepared pressure-sensitive adhesive layer was left in a constant temperature and humidity chamber (23° C., 60% RH) for about 7 days. Then, about 0.3 g of the pressure sensitive adhesive was poured into a stainless 200 mesh wire net and dipped into 100 ml of ethyl acetate. The resulting product was stored in a dark room at room temperature for 3 days. Then, the insoluble content was separated and dried in an oven at 70° C. for 4 hours. Then, its weight was measured and the gel fraction was measured using it.

2. Evaluation of Adhesion Strength and Re-Movability

The prepared polarizer was cut in a size of 25 mm×100 mm (width×length) to prepare a sample, and then adhered to an alkali-free glass using a laminator after removing the releasing sheet. Then, the resulting product was pressed in autoclave (500° C., 0.5 atmospheres) for about 20 minutes, and stored in the Temperature and Humidity Room Chamber (23° C., 50% RH) for 24 hours. Then, adhesion strength was measured under a condition in a detachment speed of 300 mm/min and a detachment angle of 180 degrees using Texture analyzer (Stable Micro Systems Ltd. (UK)), and evaluated re-movability through this measurement, based on the following basis.
- ○: after 1 day, adhesion strength being 800 or less
- Δ: after 1 day, adhesion strength being 1,000 or more
- x: after 1 day, adhesion strength being 2,000 or more 3. Evaluation of Endurance Reliability The prepared polarizer was cut in a size of 90 mm×170 mm (width×length) to prepare a sample, and said sample was attached to both sides of a glass substrate (110 mm×190 mm×0.7 mm=width×length×height), with each optical absorbing axis crossed, to prepare a specimen. At this time, applied pressure was about 5 Kg/cm², and the attachment process was carried out in a clean room to prevent any bubbles and foreign substances from being generated. Then, to evaluate moisture-heat resistance of the prepared specimens, they were left at a temperature of 60° C. and a relative humidity of 90% RH for 1,000 hours and then evaluated formation of bubbles or peeling. Also, in order to know their heat-resistance, they were left at 80° C. for 1,000 hours and then evaluated formation of bubbles or peeling. The evaluation was carried out after specimens were left at room temperature for 24 hours immediately before evaluating their states. The evaluation standard of humidity resistance and heat resistance was as follows.
- ○: No bubble and peeling phenomenon were observed.
- Δ: A few bubbles and/or peeling phenomenon were observed.
- x: Many bubbles and/or peeling phenomenon were observed.

4. Light Transmission Uniformity

The evaluation of light transmission uniformity was carried out using the same specimen as that used for evaluating the endurance reliability. Specifically, it was observed whether or not light was leaked from each prepared specimen using back light in a dark room. As a method of testing light transmission uniformity, a polarizer with attached pressure-sensitive adhesive layer was attached to a 22 inch monitor (manufactured by LG Philips LCD), stored under constant temperature and humidity conditions for 1 week, left in an oven at 80° C. for 200 hours, and evaluated about light transmission uniformity of four side conferences in the monitor square. At this time, the evaluation standard of light transmission uniformity was as follows.
- ⊙: Non-uniformity phenomenon of light transmission in four conferences of monitor was not determined by the naked eye.
- ○: Non-uniformity phenomenon of light transmission in four conferences of monitor was slightly observed.
- Δ: Some non-uniformity phenomenon of light transmission in four conferences of monitor was observed.
- x: A large quantity of non-uniformity phenomenon of light transmission in four conferences of monitor was observed.

The results measured by the methods as above were arranged and described in Table 3 below.

TABLE 3

|  | Example | | | | | | Comparative Example | | |
|---|---|---|---|---|---|---|---|---|---|
|  | 1 | 2 | 3 | 4 | 5 | 6 | 1 | 2 | 3 |
| Gel Content (%) | 88 | 83 | 85 | 89 | 88 | 80 | 81 | 80 | 5 |
| Adhesion Strength (N/25 mm) | 500 | 700 | 400 | 600 | 600 | 800 | 900 | 900 | 2000 |
| Re-movability | ○ | ○ | ○ | ○ | □ | □ | □ | □ | X |
| Heat Resistance Durability | ○ | ○ | ○ | ○ | ○ | □ | X | X | X |
| Heat Humidity Resistance Durability | ○ | ○ | ○ | ○ | ○ | □ | X | X | X |
| Light Transmission Uniformity | ⊙ | ⊙ | ⊙ | ⊙ | ○ | □ | □ | □ | X |

As can be seen from the results of Table 3 above, in case of Examples 1 to 6 according to the present invention, of which pressure-sensitive adhesive includes IPN by comprising the primary crosslinking structure formed by a base resin and a crosslinking agent, and the secondary crosslinking structure formed by the multi-functional compounds, when the compositions were applied to LCD, it could be seen from the experimental results that they did not only represent excellent light transmission uniformity, but also had superior endurance reliability, adhesion property, and the like. However, in case of Comparative Examples, in which only single crosslinking structure was imparted, or only one multi-functional compound is used, they caused not only a large quantity of light leakage phenomenon at four conferences of large monitor, but also represented lowered adhesion strength and re-movability.

The invention claimed is:

1. A pressure-sensitive adhesive composition, including Interpenetrating polymer networks in a cured state,
    wherein the pressure-sensitive adhesive composition comprises (A) a base resin; (B) a primary multi-functional compound; (C) a secondary multi-functional compound capable of reacting with the primary multi-functional compound; and (D) a multi-functional cross-linking agent,
    wherein the (B) primary and (C) secondary multi-functional compounds are selected so as to show specific reactivity to each other so as to form a crosslinking structure by being reacted with each other, and also are selected so as not to participate in a crosslininking reaction between the (A) base resin and the (D) cross-linking agent,
    wherein the interpenetrating polymer network comprises a crosslinking structure formed by the crosslinking reaction between the (A) base resin and the (D) cross-linking agent and the crosslinking structure formed by the reaction between the (B) primary and (C) secondary multi-functional compounds,
    wherein the (B) primary and (C) secondary multi-functional compounds are one or more selected from the group consisting of a multi-functional alcohol compound, a multi-functional carboxylic acid compound, a multi-functional anhydride compound, a multi-functional amine compound, a multi-functional glycidyl compound and a multi-functional silicone compound, and the multi-functional compounds (B) and (C) are comprised in an amount of 3 to 10 parts by weight relative to 100 parts by weight of (A) the base resin, respectively, wherein, the multi-functional alcohol compound, the multi-functional carboxylic acid compound, the multi-functional anhydride compound, the mulit-functional amine compound or the multi-functional glycidyl compound is one or more selected from the group consisting of 4-amino-4-(3-hydroxypropyl)-1,7-heptanediol, 1,5-dihydroxy anthraquinone, 1,2-benzene dimethanol, 1,2,4-benzenetriol, 2- benzyloxy-1,3-propanediol, 2,2'-biphenyldimethanol, 2,2'-bipyridene-3,3'-diol, 2,2-bis(bromomethyl)-1,3-propanediol, 1-[N,N-bis(2-hydroxyethyl)amino]-2-propanol, N,N-bis(2-hydroxyethyl)isonicotinamide, bis(2-hydroxyethyl) terephthalate, 2,2-bis(hydroxymethyl)butyric acid, 4-bromo-3,5-dihydroxybenzoic acid, 2-(bromomethyl)-2-(hydroxymethyl)-1,3-propanediol, 3-bromo-1,2-propanediol, tert-Butylhydroquinone, chlorohydroquinone, 5-chloro-2,3-pyridinediol, 1,2-cyclohexanediol, cis,cis-1,3,5-cyclohexanetriol dihydrate, 3-cyclohexene-1,1-dimethanol, cis-1,2-cyclopentanediol, 1,2- decanediol, 2,3-dibromo-1,4-butanediol, trans-2,3-dibromo-2-butene-1,4-diol, 2,5-dibromohydroquinone, 2,3-dichloro-5,8-dihydroxy-1,4-naphthoquinone, diethyl bis(hydroxymethyl)malonate, diethyl 2,5-dihydroxyterephthalate, 3,5-dihydroxyacetophenone, 4,4'-dihydroxybenzophenone, 2,5-dihydroxy-1,4-benzoquinone, 2,2-dihydroxy-5-methoxy-1,3-indandione hydrate, 2,6-Dihydroxy-4-methyl-3-pyridinecarbonitrile, tris(2-hydroxyethyl)isocyanurate, 1,1,1-tris(4-hydroxyphenyl)ethane, 2,4,6-trihydroxybenzoic acid, 3,3,3',3'-tetramethyl-1,1'-spirobiindane-5,5',6,6'-tetraol, N,N,N',N'-tetrakis(2-Hydroxypropyl) ethylenediamine, 1,3-acetonedicarboxylic acid, 1,3-adamantanediacetic acid, 1,3-adamantanedicarboxylic acid, azelaic acid, benzylmalonic acid, biphenyl-4,4'-dicarboxylic acid, 2,2'-bipyridine-4,4'-dicarboxylic acid, bis(carboxymethyl)trithiocarbonate, 2-bromoterephthalic acid, 5-tert-butylisophthalic acid, butylmalonic acid, 1,2,3,4-butanetetracarboxylic acid, dietylenetriaminepentaacetic acid, 4-amino-1,8-naphthalic anhydride, benzophenone-3,3',4,4'-tetracarboxylic dianhydride, 3,3',4,4'-biphenyltetracarboxylic dianhydride, diethylenetriaminepentaacetic dianhydride, ethylenediaminetetraacetic dianhydride, 4,4'-(4,4'-isopropylidenediphenoxy)bis(phthalic anhydride), 4,4'-oxydiphthalic anhydride, pyromellitic dianhydride, 2-aminophenyl disulfide, 1,2,4,5-benzenetetracarboxamide), 4,4'-(1,1'-biphenyl-4,4'-diyldioxy)dianiline, 6-chloro-3,5-diamino-2-pyrazinecarboxamide, 1,3-cyclohexanebis(methylamine), 4,4'-diaminobenzanilide, diaminobenzophenone, 2,6-diaminopurine, 2,5-dimethyl-1,4-phenylenediamine, 4,4'-(Hexafluoroisopropylidene)dianiline, 3,3'-methylenedianiline, 3,4'-oxydianiline, 4,4'-(1,3-phenylenedioxy)dianiline, poly(l,4-butanediol)bis(4-aminobenzoate), tris(2-aminoethyl)amine, p-xylylenediamine, 1,3-bis(N,N-diglycidylaminomethyl)cyclohexane, N,N,N'N'-tetraglycidyl-m-xylenediamine, triglydicyl isocyanurate, tris(2-carboxyethyl)isocyanurate, bis[4-(glycidyloxy)phenyl]methane, 1,3-butadiene diepoxide, 1,4-butanediol diglycidyl ether, 1,4-cyclohexanedimethanol diglycidyl ether, dicyclopentadiene dioxide, diglycidyl 1,2-cyclohexanedicarboxylate, N,N-diglycidyl-4-glycidyloxyaniline, glycerol diglycidyl ether, 4,4' -methylenebis(N,N-diglycidylaniline), resorcinol diglycidyl ether and tris(4-hydroxyphenyl) methane triglycidyl ether, wherein the multi-functional silicone compound is one or more selected from the group consisting of 1,4-bisk[dimethyl[2-(5-norbomen-2-y)ethyl]silyl]benzene, 1,3-dicyclohexyl-1,1,3,3-tetrakis(dimethylsilyloxy)disiloxane, 1,3-dicyclohexyl-1,1,3,3-tetrakis(dimethylvinyl-silyloxy)disiloxane, 1,3-dicyclohexyl-1,1,3,3-tetrakis[(norbornen-2-yl)ethyldimethylsilyloxyl]-disiloxane, 1,3-divinyltetramethyldisiloxane, 1,1,3,3,5,5-hexamethyl-1,5-bis[2-(5-norbornen-2-yl)ethyl]trisiloxane, silatrane glycol, 1,1,3,3-tetramethyl-1,3-bis[2-(5-norbornen-2-yl)ethyl]disiloxane, 2,4,6,8-tetramethyl-2,4,6,8-tetravinylcyclotetrasiloxane, N-[3 -(trimethoxy-silyl)propyl]-N' -(4-vinylbenzyl)ethylenediamine, 6-bis(trichlorosilyl)hexane, 1,6-bis(trichlorosilyl)ethane, dimethyldiacetoxysilane, methyltriethoxysilane, vinyl-methyl-diacetoxysilane, methyltrimethoxysilane, ethyltriacetoxysilane, dimethyltetramethoxydisiloxane, methyltriacetoxysilane, tetraethoxysilane, vinyltriacetoxysilane, tetramethoxysilane, silicon tetraacetate, tetrapropoxysilane, dimethyldiethoxysilane, 1,1,3,3-tetramethyl-1,3-diethoxydisiloxane, (bis(N-methylbenzylamido)ethoxymethylsilane, bis(dimethylamino)-dimethylsilane, bis(dimethylamino)methylvinylsilane, tris(dimethylamino)methylsilane, tris(cyclohexylamino)methylsilane, vinyltris(methylethylketoximine)silane, methyltris(methyl-ethylketoxime)silane, vinyltris(isopropenoxy)silane, tetramethyldisiloxane, 1,3,5,7-tetramethylcyclotetrasiloxane, methylhydrocyclosiloxane, 1,3-divinyltetramethyldisiloxane, 1,3,5-trivinyl-1,1,3,5,5-pentamethyl trisiloxane and tetravinyltetramethylcyclotetrasiloxane, and wherein the pressure-sensitive adhesive composition has a form of pressure-sensitive adhesive having re-movability in the cured state and the pressure-sensitive adhesive has an adhesion strength with respect to alkali-free glass of 800 gf/25 mm or less.

2. The pressure-sensitive adhesive composition according to claim 1, wherein, (A) the base resin is an acrylic copolymer having a weight-average molecular weight of not less than 1,000,000.

3. The pressure-sensitive adhesive composition according to claim 2, wherein, the acrylic copolymer comprises 80 to 99.8 parts by weight of (meth)acrylic acid ester monomer; and 0.01 to 10 parts by weight of a monomer containing a cross-linkable functional group, relative to 100 parts by weight of total acrylic copolymer monomers.

4. The pressure-sensitive adhesive composition according to claim 3, wherein, the (meth)acrylic acid ester monomer is one or more selected from the group consisting of ethyl (meth) acrylate, n-propyl (meth)acrylate, isopropyl (meth) acrylate, n-butyl (meth)acrylate, t-butyl (meth)acrylate, sec-butyl (meth)acrylate, pentyl (meth)acrylate, 2-ethylhexyl (meth)acrylate, 2-ethylbutyl (meth)acrylate, n-octyl (meth)acrylate, isooctyl (meth)acrylate, isononyl (meth)acrylate, lauryl (meth)acrylate and tetradecyl (meth)acrylate.

5. The pressure-sensitive adhesive composition according to claim 3, wherein, the monomer containing a cross-linkable functional group is one or more selected from the group consisting of a monomer containing a hydroxyl group, a monomer containing a carboxyl group, a monomer containing nitrogen and a monomer containing a glycidyl group.

6. The pressure-sensitive adhesive composition according to claim 3,
wherein the acrylic copolymer further comprises a monomer represented by Formula 1:
Formula 1:

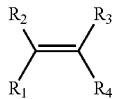

wherein, $R_1$, $R_2$ and $R_3$ represents independently hydrogen or alkyl, $R_4$ represents cyano; phenyl unsubstituted or substituted with alkyl; acetyloxy; or $COR_5$, where $R_5$ represents amino unsubstituted or substituted with alkyl or alkoxyalkyl.

7. The pressure-sensitive adhesive composition according to claim 1,
wherein the cross-linking agent is one or more selected from the group consisting of isocyanate compound, epoxy compound, aziridine compound and metal chelate compound.

8. The pressure-sensitive adhesive composition according to claim 1,
wherein, the multi-functional cross-linking agent is comprised in an amount of 0.1 to 5 parts by weight, relative to 100 parts by weight of the (A) base resin.

9. The pressure-sensitive adhesive composition according to claim 1, further comprising a silane coupling agent.

10. The pressure-sensitive adhesive composition according to claim 1, further comprising a tackifier resin.

11. The pressure-sensitive adhesive composition according to claim 1, further comprising one or more additives selected from the group consisting of an epoxy resin, a hardener, a UV stabilizer, an antioxidant, a colorant, a reinforcing agent, a filling agent, a defoaming agent, a surfactant and a plasticizer.

12. A polarizer, comprising: a polarizing film; and
a pressure-sensitive adhesive layer which is formed on one or both sides of said polarizing film, and comprises a cured product of the pressure-sensitive adhesive composition according to claim 1.

13. The polarizer according to claim 12,
wherein a gel content as represented in General Formula 1 below is 80% to 99%:

gel content (%)=$B/A$×100        General Formula 1 wherein, A represents weight of the pressure-sensitive adhesive, and B represents dry weight of insoluble content after depositing the pressure-sensitive adhesive in ethyl acetate at 23° C. for 48 hours.

14. The polarizer according to claim 12, further comprising one or more functional layer(s) selected from the group consisting of protective layer, reflecting layer, anti-glare layer, phase difference plate, compensation film for wide view angle and brightness enhancing film.

15. A liquid crystal display comprising a liquid crystal panel in which the polarizer according to claim 12 is bonded to one or both sides of a liquid crystal cell.

* * * * *